July 30, 1935.  E. F. HATHAWAY ET AL  2,009,798
RUG DISPLAY APPARATUS
Filed Nov. 2, 1933   6 Sheets-Sheet 1
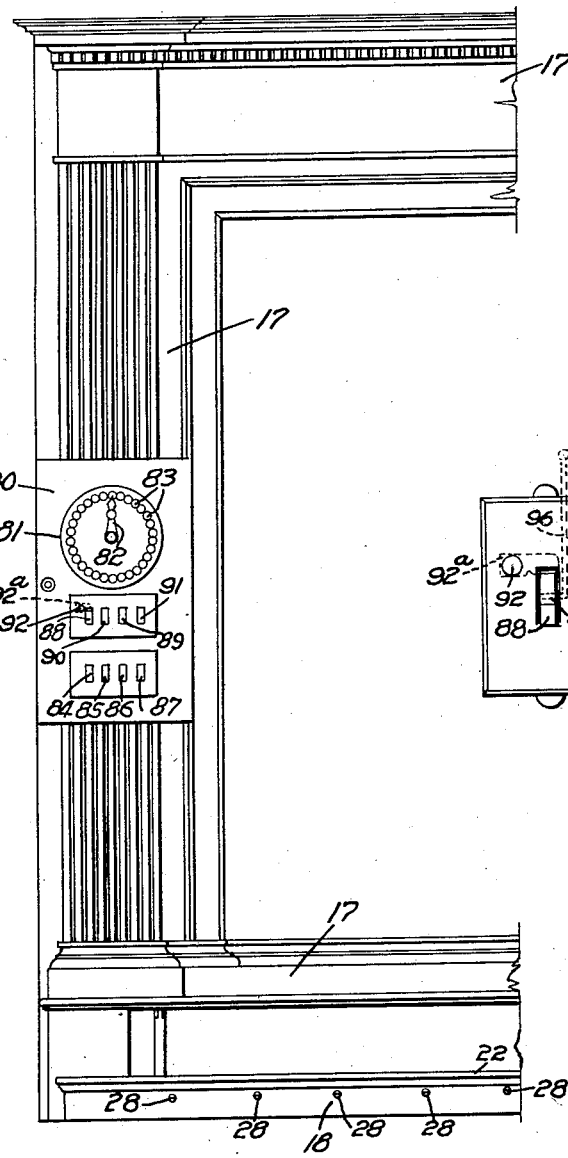
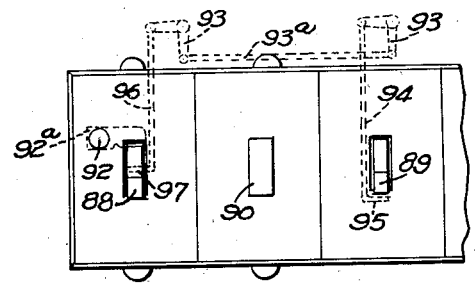
Inventors:
Edgar F. Hathaway,
Walter Bixby,
by Emery, Booth, Varney and Townsend
Attys.

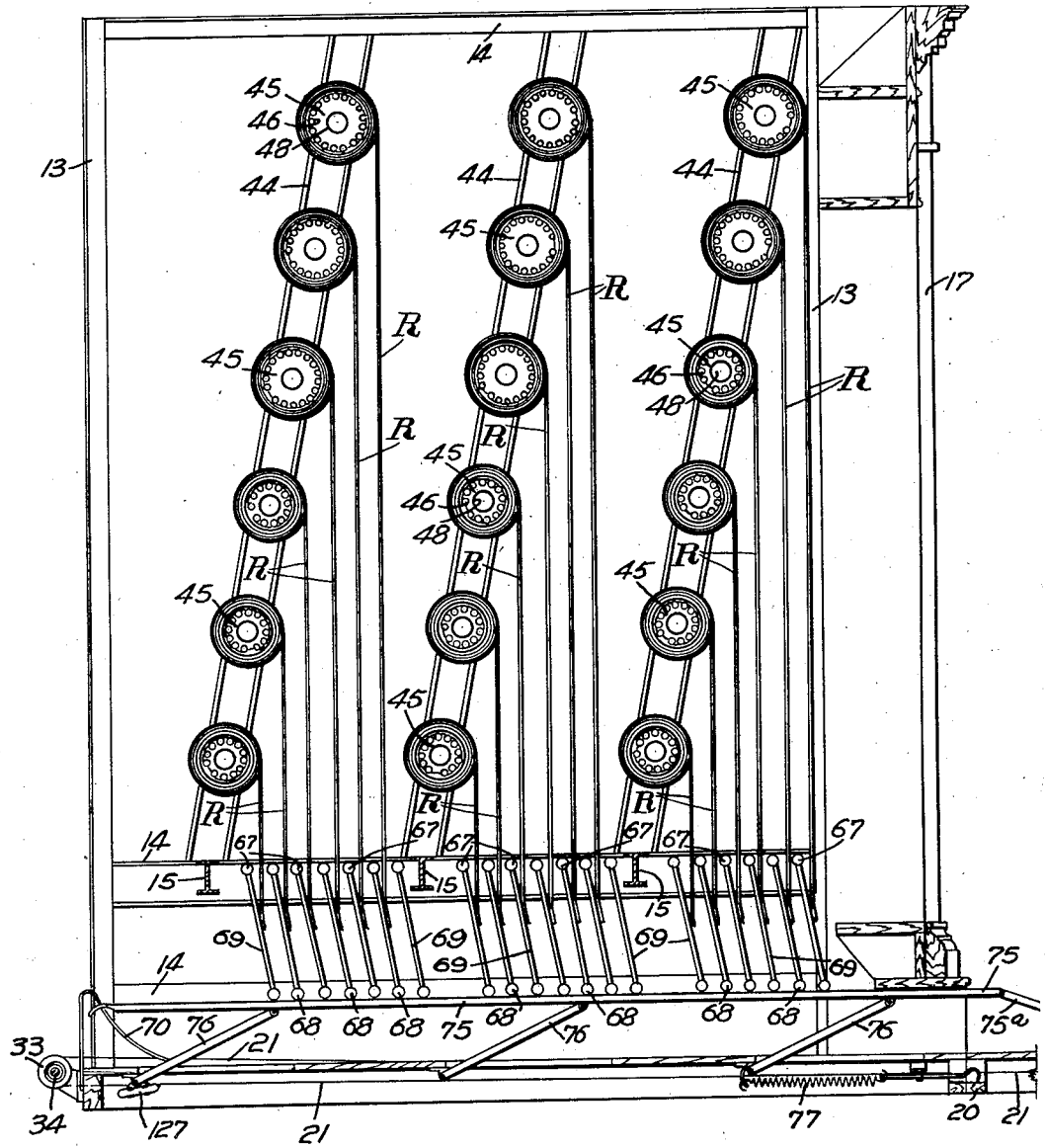

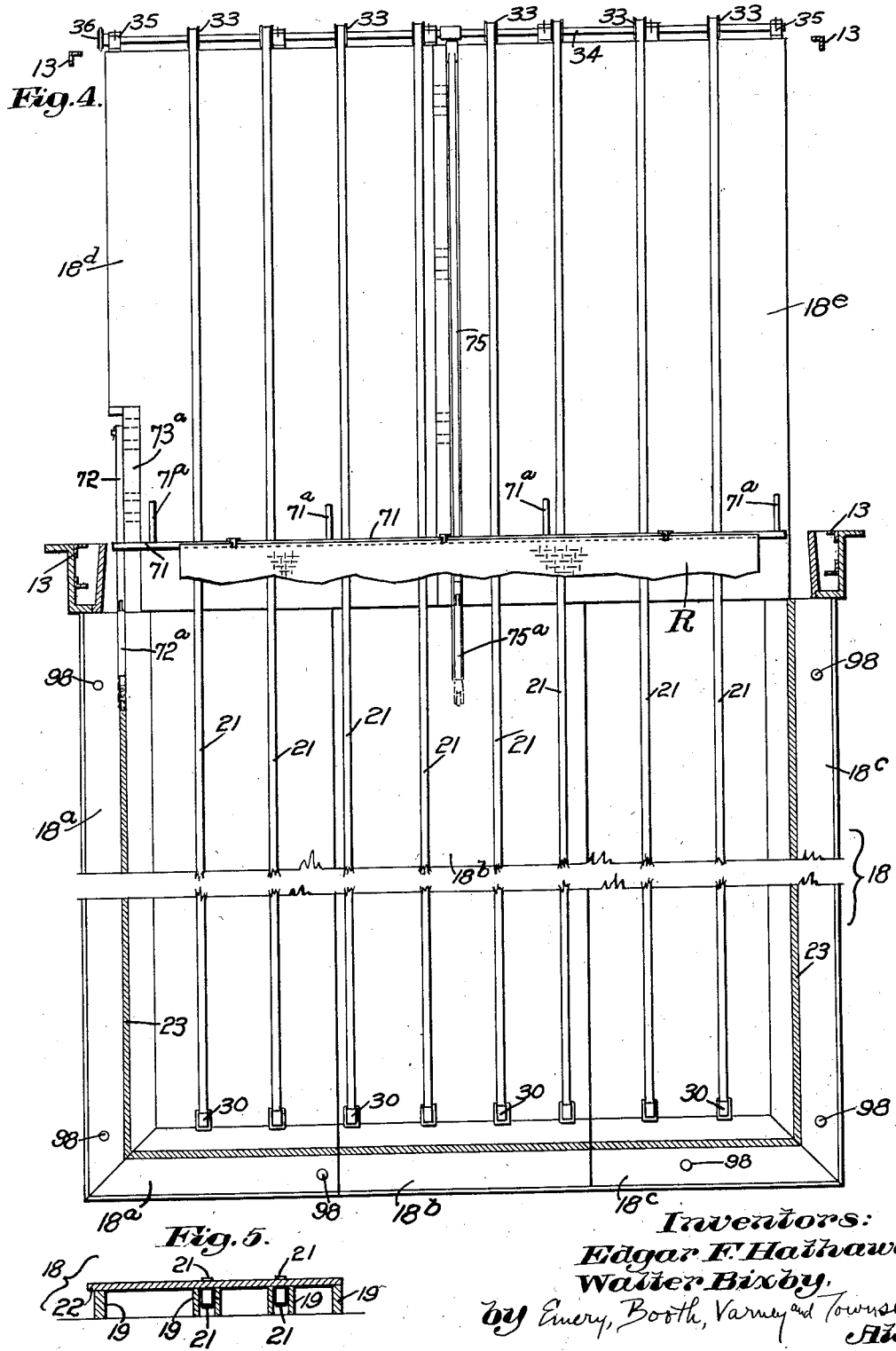

July 30, 1935.　　E. F. HATHAWAY ET AL　　2,009,798
RUG DISPLAY APPARATUS
Filed Nov. 2, 1933　　6 Sheets-Sheet 5
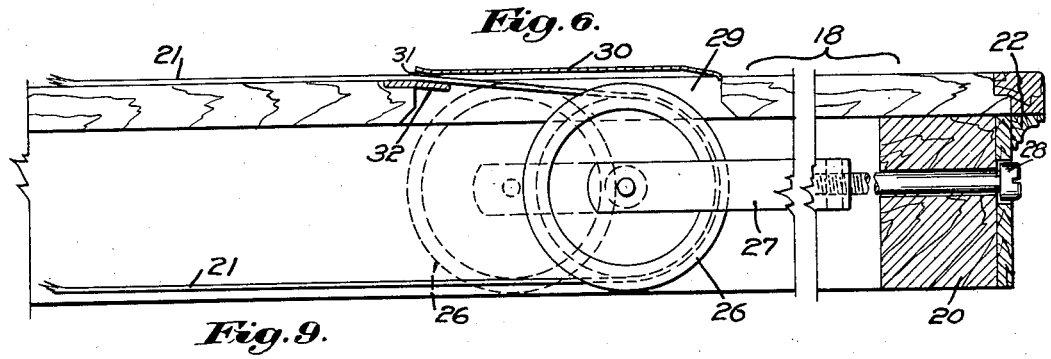
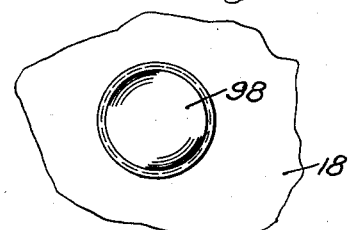
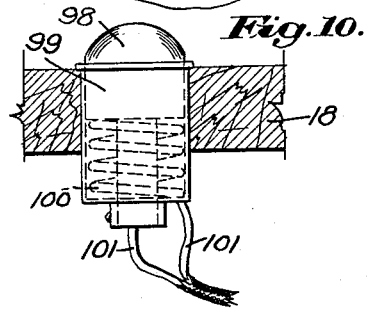
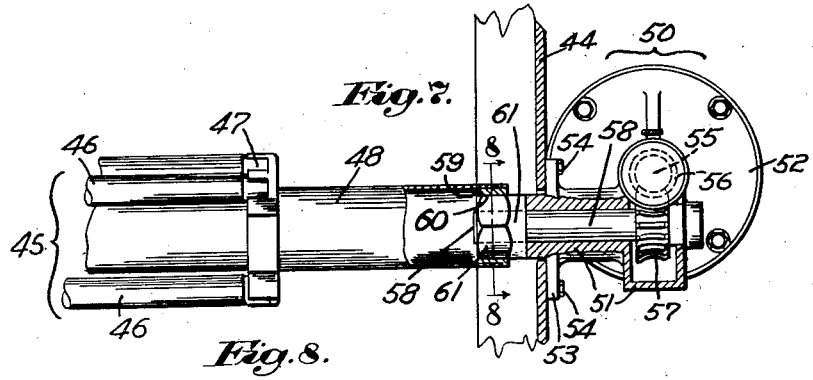
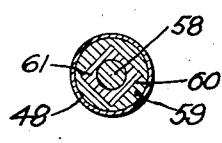
Inventors:
Edgar F. Hathaway,
Walter Bixby,
by Emery, Booth, Varney and Townsend
Attys.

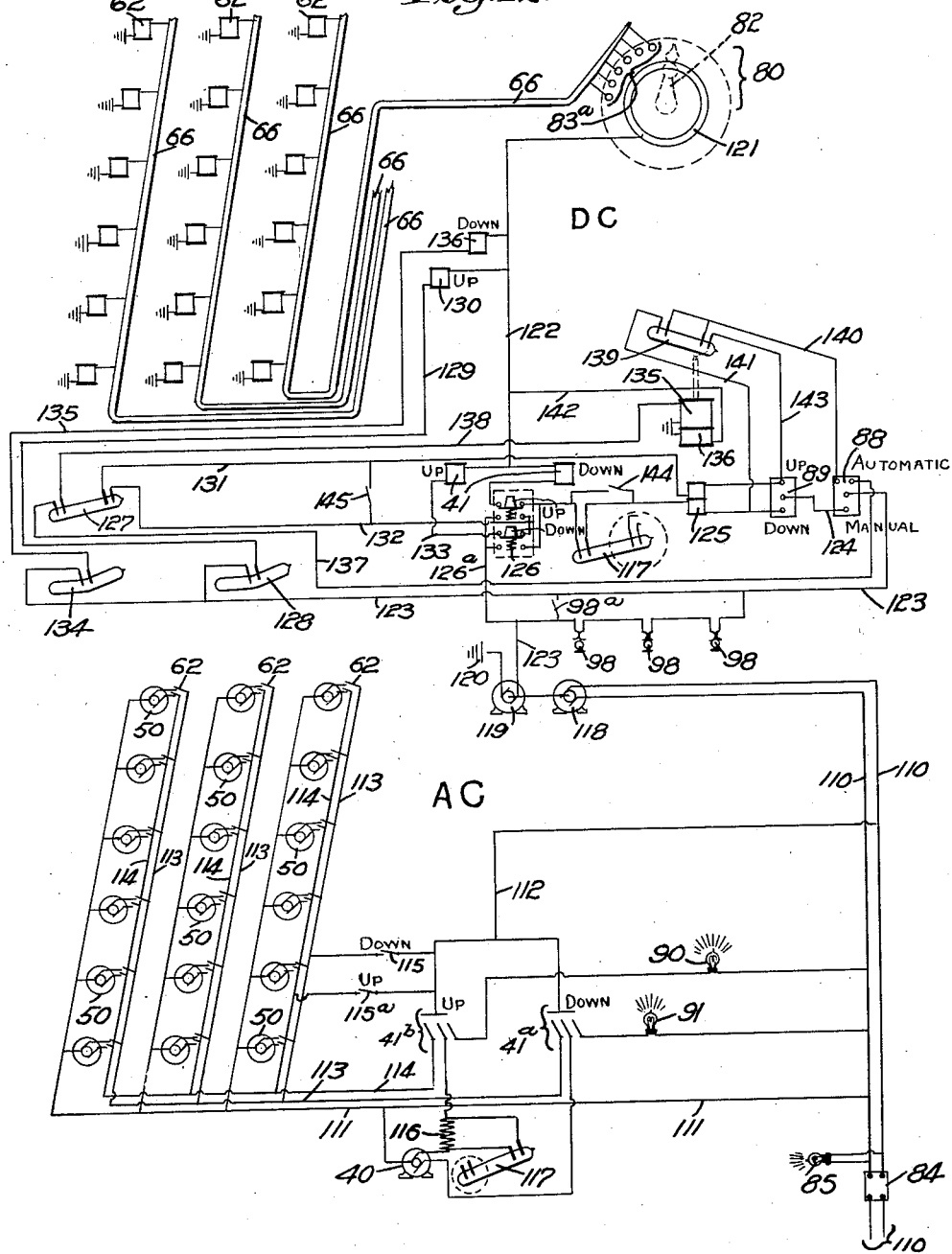

Patented July 30, 1935

2,009,798

UNITED STATES PATENT OFFICE 2,009,798

RUG DISPLAY APPARATUS

Edgar F. Hathaway, Wellesley, and Walter Bixby, Dorchester, Mass.

Application November 2, 1933, Serial No. 696,360

33 Claims. (Cl. 40—53)

Our present invention relates to apparatus for storing and displaying relatively bulky flexible sheet articles such as rugs, linoleum, floor coverings in general and other webs, and contemplates certain improvements upon the apparatus of our earlier copending applications, Serial No. 590,458, filed February 2, 1932, and Serial No. 614,468, filed May 31, 1932.

In the drawings illustrating by way of example one embodiment of the invention,

Fig. 1 is a front elevation of the left half portion of the apparatus as a whole;

Fig. 3 is a vertical longitudinal section corresponding to Fig. 2;

Fig. 4 is a horizontal section through the apparatus, taken at a level slightly above that of the display platform, and showing the latter in plan;

Fig. 5 is a vertical section transversely through a portion of the display platform;

Fig. 6 is a longitudinal vertical section, upon a larger scale, of a portion of the display platform;

Fig. 7 is a view partly in elevation and partly in vertical section illustrating one of the rug supporting and drive units;

Fig. 8 is a detail section on the line 8—8 of Fig. 7;

Figs. 9 and 10 are respectively a plan and a side elevation of a master control element which may be provided for interrupting the display or return movement of a rug at the will of the operator;

Fig. 11 is a partly diagrammatic view in elevation illustrating an interconnecting control means between two of the control elements; and Fig. 12 is a wiring diagram.

Figure 2:
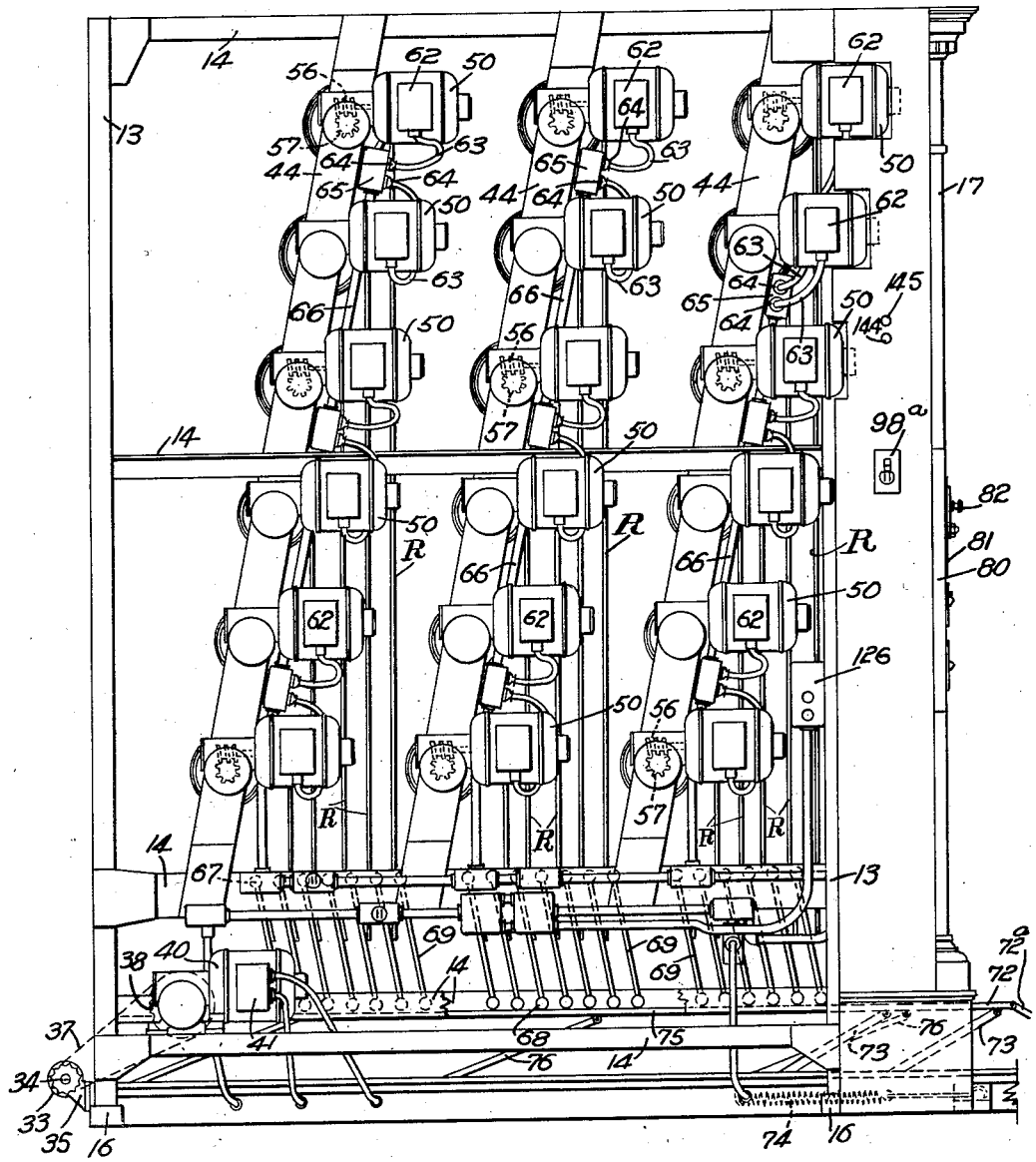
Fig. 2 is a right side elevation of said apparatus, the display platform being broken away.

Referring first to Figs. 1 to 4, the apparatus as a whole comprises a suitable framing including the uprights 13, longitudinal beams 14 and the cross-beams 15, on a suitable base such as provided by the pedestals 16. The framing and apparatus as a whole is preferably concealed by a decorative front 17 and in this and other respects may be generally similar to the apparatus as disclosed in our said copending application Serial No. 614,468.

Forwardly of the decorative front 17 is a display platform onto which the rugs are adapted to be extended flatwise for examination and display. As in our said preceding applications the term "rug" herein is inclusive of the various bulky web articles with which our invention is adapted for use. Said display platform, indicated as a whole by the numeral 18, is seen in plan in Fig. 4 while portions of it appear in section in Figs. 5 and 6. It is illustrated as of sectionalized form, being built up of a plurality of detachable units permitting it readily to be knocked down or set up for use, and to be varied in size by adding or removing the desired number of sectional units.

In Fig. 4 five platform units 18$^a$, 18$^b$, 18$^c$, 18$^d$ and 18$^e$ are illustrated by way of example, including a front row of three units 18$^a$—18$^c$ with portions broken away, and a rear row of the two units 18$^d$ and 18$^e$. Each unit includes longitudinal and transverse beams, 19 and 20, see Figs. 5 and 6, supporting the flooring itself, the latter preferably being of hardwood or other floor material, simulating an actual floor of a room. The several units are constructed and arranged so that they may be fitted together, or joined into a connected and apparently integral whole. They may be held in operative position by any suitable interconnecting means, such as pins, tongue and slot connections, cross strips or the like.

The described platform is laid down and assembled at the front of the apparatus, in position to receive individual rugs as they are moved from their stored positions, and presenting a surface on which the rugs may be extended flatwise for display and examination. It will be understood that the platform structure as herein illustrated and above described, while novel in itself and in combination with other features, is but representative of a surface over which the display may be made. As in said copending application, any convenient area or surface may be utilized such as the floor or other basal space where an exhibit is desired; and any such surface, whether or not installed especially for the purpose, may be elevated or otherwise, with respect to adjacent areas.

The extending of the rugs for display is effected by means of a series of conveyors or belts 21, in a generally similar manner as in our preceding application S. N. 614,468, but with various improvements in the extending mechanism. The upper runs of these belts, which extend substantially the entire distance from front to rear of the apparatus, rest directly upon the display surface or floor of the platform, running out to a position adjacent the front edge of the latter. The outer edges of the several platform units are attractively finished with a bead or molding 22, while the platform as a whole may be given a further unified and attractive appearance as by the decorative border 23 extending along and across the several platform units and setting off the space within which the rugs are extended.

The several belts 21 pass about pulleys 26 (see particularly Fig. 6) mounted on the platform, below the floor level. These pulleys are desirably disposed for adjusting movement lengthwise the platform, to regulate the tension of the belts. As shown in Fig. 6, each pulley is journaled in a bracket 27 supported for longitudinal sliding movement and receiving at its front end a screw 28 extending through the front wall of the platform, with its slotted head portion accessible at the front of the latter. Two adjusted positions of a pulley and its bracket are represented by the full line and dotted line showings thereof, in Fig. 6. The platform sections are appropriately slotted as at 29 to receive the upper portions of the pulleys, these slots being covered as by removable plates 30 having up-turned rear portions 31, Fig. 6, cooperating with lower guide plates 32 at the rear edge of the slot 29 to provide a receiving and guiding throat for the upper run of the belt. As seen in Fig. 5, some of the longitudinal platform supports 19 are disposed in pairs, providing guide channels for the lower runs of the belts 21, below the platform, and facilitating the initial or replacement threading of the belts into position.

The belts are extended rearwardly beyond the platform and beneath the storage positions of the entire series of rugs and passed about rear pulleys 33, Figs. 2, 3 and 4, on a shaft 34 journaled in brackets 35 at the base of the apparatus. This shaft carries a sprocket 36 receiving the belt-driving chain 37. Referring to Fig. 2, the other end of said chain passes about a drive sprocket 38 connected through suitable gearing and worm transmission with the motor drive unit 40 suitably supported upon the framing of the apparatus, as upon the lower longitudinal beam 14. This motor is of the reversible type and is equipped with a double-contact circuit closing or controlling relay 41, the operation of which will be explained in connection with the wiring diagram.

As in our preceding application Serial No. 614,468, the rug storing and controlling mechanism is arranged in units, of which any desired number may be employed to suit the requirements of a particular installation. Each rug storage and manipulating unit is arranged to accommodate a plurality of rugs, numbering six in the present embodiment. Referring to Figs. 3 and 4, each such unit comprises a frame including a side member 44 at its opposite sides arranged for removable support on the main framing, in a forwardly and upwardly inclined position substantially as in said figures. The lower portions of the unit sides are carried by the longitudinal beams 14, preferably adjacent the cross-beams 15, and above the plane of the conveyor belts, their upper ends being removably fastened to the top longitudinal beams 14.

Each rug R of a storage unit is detachably carried upon an individual drum or beam 45, seen in section in Fig. 3. An end portion of one rug beam is also illustrated in Fig. 7. These beams are preferably of a light and open or basket-like construction similarly as in our said copending application Serial No. 614,468, each beam comprising a circumferential series of bars 46 removably held in and extending between spacer plates or heads 47 on a hollow tubular shaft or core 48.

In accordance with our present invention each rug is provided with its own individual power unit or motor 50, as contrasted, for example, with a common drive and clutch control such as that of our copending application Serial No. 614,468. As illustrated, each individual rug driving unit, including the motor and the transmission connections to the rug beams, is built as a structural unit including a common housing for the motor, the motor shaft and worm gearing connections, so that each such rug drive unit may readily be attached or demounted individually.

As best seen in Fig. 7, the transmission housing 51 is integral with or attached to the motor housing 52 and is formed with an attaching plate or base 53 received vertically against the adjacent side member 44 of the particular rug storage unit, to which it is detachably anchored as by the bolts 54. The motor shaft 55 carries a worm 56 meshing with a worm wheel 57 at right angles thereto on a shaft 58 journaled in the housing 51.

The adjacent end of the tubular core 48 of each rug drum has a bushing 59, see also Fig. 8, provided with a central squared aperture 60 which slidably receives a similarly squared sleeve 61 upon and secured to the inner end of the worm wheel shaft 58. Thus any rug drive unit, including the motor and the gearing connections, may be demounted merely by removing the bolts 54, the worm shaft 58 sliding out from the bushing 59 at the end of the shaft or core 48 of the rug drum.

Associated with each of the described motor and drive units for the individual rugs, and herein mounted directly upon the motor casing 52, is a motor circuit double-contact controlling relay, the housing of which is seen at 62, Fig. 2. These circuit closers or relays may be of any suitable or usable form not necessary to illustrate in detail herein. The conductors for supplying current to the motors themselves and also the conductors for the relay circuits are herein contained in a flexible cable or multi-conductor 63 having a connecting plug 64 whereby all the necessary electrical connections for the particular motor and its control mechanism may be removably connected or plugged into the adjacent outlet box 65. A plurality of these boxes, herein shown as double, to accommodate two rug drive units, are located at convenient intervals along the rug unit side frames 44, being supported and interconnected by the tubular conductor housings or pipes 66.

By reference to Figs. 2 and 3 and from the foregoing description, it will be understood that the several rugs R of each storage unit are disposed in vertically spaced relation and somewhat offset from each other, from front to rear of the apparatus, by reason of the forward inclination of the frames of the storage units. The rug beams of any particular storage unit may be of different diameter, for example, graduated from a smaller to a larger diameter toward the top of the storage unit. The leading portion of each rug R, in its normal or stored position, is desirably extended or hangs down to the same or approximately the same level. Assuming the rugs are all of the same size, a shorter length of a rug is wound upon its beam in the case of the upper beams, than on those at the lower portion of the storage frame. As the rolled portion of a rug R builds up on its beam obviously the lineal speed at which a rug is drawn onto its beam increases. But by using beams of different size this speed may be kept substantially uniform for all the rugs. Where the rugs are of varying sizes in any one rug storage unit, the smaller rugs desirably are placed upon the lower beams, for similar reasons.

From the foregoing it is seen that we have provided an extremely compact, simple and light-weight individual power unit for each rug beam. These units are wholly self-contained and are standardized or interchangeable, and so mounted that any one may be quickly demounted and replaced by another unit, the electrical connections being accomplished merely by plugging into the appropriate outlet box. The individual power units and direct positive drive afford a rapid and certain operation free from operating lag while also automatically accommodating themselves to widely varying loads. The apparatus so constructed is easily serviced, at low maintenance cost, since any one of the power units may be quickly demounted for servicing, and replaced by another without loss of operating time for the apparatus as a whole, or any one or more units may be cut out of operation at any desired time. In addition to the advantages of compactness, interchangeability and the others mentioned, we have eliminated mechanical brakes for the rug beams and otherwise simplified the apparatus, through the medium of the individual power units, with equal or improved accuracy and nicety in the control and operation of the apparatus as a whole. Not only is there no lag at the beginning of a rug movement, in either direction, but the rug beams come instantly to rest at the desired times without overrunning.

In the present embodiment of our invention, as in that of our preceding applications, the individual rugs are moved edgewise and herein vertically downwardly from their stored positions, and are received by the endless conveyors or belts which extend them flatwise, herein horizontally, into display position upon the platform 18. Each rug R is caused to change its direction of movement or, so to speak, to turn the corner in its travel from storage to display position and return.

In this connection we preferably provide means for assisting the rug in this change of direction, and for avoiding interference between the depending or other portions of the several rugs. Referring to Figs. 2 and 3, we have illustrated for this purpose a series of separating and guiding devices. These comprise a plurality of upper rods 67 extending horizontally between and removably carried by the longitudinal beams 14 at the opposite sides of the frame of the apparatus. A similar series of lower rods 68, as a whole, is set somewhat forward of the upper series. Corresponding rods of the two series are joined by the inclined guides or bars 69, any desired plurality of which may be distributed across the apparatus. Two adjacent rods of the upper series 67 are positioned at the opposite sides of the depending portions of the corresponding rug R, so that the two series of rods together with their connecting bars 69 form in effect guide passages for the rugs as they approach the point of change in direction of movement, that is, as they approach the belts 21. The inclining of the guides 69 serves to prepare the rugs for this directional change in movement. They operate similarly but in reverse manner during return movement of the rugs.

By reference to Fig. 3, it will be seen that the rear pulleys 33 for the belts 21 are so positioned that a portion of each belt at the rear of the apparatus is held up off of and above the platform level. The slight downward and forward inclination at the rear of the belts tends to assist in throwing the rugs forwardly, aiding their smooth movement as they change their direction of travel. At or near the rear portions of the belts we may also provide a series of inclined guard strips 70, Fig. 3. In case a rug, in moving back to stored position, should overrun its vertical storage plane, these guards 70 prevent such overrunning looped or folded portion of the rug from projecting back beyond the belts, and help it to shift back forwardly toward its particular vertical storage plane.

As in our previous application Serial No. 614,468 each rug is removably attached to its supporting beam by means of a clamp or carrier, one of which is seen at 71 in Fig. 4. Each such carrier is of a length to extend substantially the entire width of the apparatus and to project somewhat beyond the two sides of the widest rug for which the apparatus is designed. These carriers 71 are equipped with suitable rug attaching means, which may be such as illustrated in our said copending applications, and are themselves flexibly connected as by straps 71ª to the rug beams. The latter preferably have receiving channels for the carriers, as described in said previous application Serial No. 614,468, so that the carriers are placed inside the winding-on portion of the rug drums, out of interfering relation with the rugs wound on the latter.

As will be more fully explained, control mechanism is provided whereby any rug of the entire number stored in the apparatus may be selected and caused to be brought out into display position, in which position its movement is automatically halted. As in said copending application Serial No. 614,468, the apparatus is arranged for manual or full-automatic control. Under manual control the selected rug comes to rest in its display position, where it remains for examination. At the will of the operator it is subsequently returned to stored position. Under full-automatic operation, the rugs are displayed and returned in predetermined sequence, which sequence may be selectively varied, each rug moving out to display position, halting, and returning in uninterrupted continuous operation.

In the present embodiment of the invention the "down" or display movement of the rugs is halted by a control element arranged for operation by any of the rug carriers 71. Referring to Figs. 2 and 4, this "down" stop control comprises an arm 72 extending in a direction from front to rear of the machine and occupying an approximately horizontal but somewhat forwardly and upwardly inclined position, and having a down-turned front end 72ª. This arm 72 is located at one side of the apparatus, herein the left side, beyond the side edges of the rugs themselves but inside the ends of the rug carriers, so that it may be engaged by the latter. This control arm 72 is normally held up in raised position substantially as in Figs. 2 and 4 by a pair of parallel inclined links 73, the upper ends of which are pivoted to the arm while their lower ends are pivotally connected to a fixed part, such as the block 73ª. A suitable spring 74, seen in dotted lines in Fig. 2, serves to hold the arm 72 elevated.

The forward and upward inclination of the down-stop arm 72 is such that it comes into the level of the upper runs of the conveyor belts at the extreme rear of the display platform proper. Thus when a rug R has been fully unwound from its supporting beam and has been carried entirely out onto the display platform 18, so that its carrier or clamp 71 has come to the rear edge of the platform, to the dotted line position in Fig. 4, it comes into engagement with the arm 72 and depresses it, thus operating the associated circuit breaking device to be described and halting the "down" or display movement of the rug.

During the "down" or display movement of any given rug R, the control mechanism for stopping its subsequent return movement is conditioned for operation. In the present embodiments of our invention this conditioning of the return stop circuits and controls is effected by a vertically movable arm 75 seen in Figs. 3 and 4 and, in part, in Fig. 2, of generally similar construction in the down-stop arm 72. Said up-stop conditioning arm 75, which also has a down-turned front end 75ª, is arranged for actuation by the rugs themselves, and is of sufficient extent to underlie the entire series of stored rugs. It is supported upon a series of parallel links 76 similar to those described in connection with the down-stop arm 72 and is normally yieldingly held up in elevated position, as in Figs. 3 and 4, by the spring 77, so that it lies just below the guide rod 68, in position to be engaged by the leading edge of any rug starting its display movement. This longer, rug-operated arm 75, which may be positioned at any convenient point between the sides, but preferably centrally as shown, is thus adapted to be depressed by any rug of the entire number, as the rug moves from its stored position toward the conveyor belts. It remains depressed and so conditioned for operation as long as the rug is displayed. In the subsequent return movement of each rug, as the outermost portion of the rug approaches its stored position, the arm 75 is elevated by its spring, breaks the return circuits and halts the rug in its desired stored position.

The selecting mechanism and the "remote control" devices which are desirably provided may be disposed at any suitable location and may be variously constructed and arranged, but preferably, and as herein illustrated, are generally similar to those disclosed and claimed in our previous copending application Serial No. 614,468. As shown in Figs. 1 and 2 the selector switches and associated parts are grouped at one station, represented by the control board or panel 80, positioned to be conveniently accessible to the operator, as upon one of the side portions of the decorative front 17. At this control station is the selector proper comprising the dial 81, and the manually or automatically movable pointer 82 which may be brought opposite any one of the series of buttons or the like indicia 83, each numbered to correspond to a particular rug.

The control board 80 herein includes a main switch 84 for turning on or shutting off the power and conditioning the apparatus as a whole. Adjacent it is a main pilot 85 for visually indicating the status of the apparatus, as either set for operation or turned off.

Desirably provision is made for illuminating the displayed rugs, both under daylight and lamp light conditions, as in our preceding application Serial No. 614,468. The two series of lights, one of so-called daylight bulbs and another of ordinary or Mazda lamps, not shown, are controlled by convenient switches upon the control board 80 or elsewhere, the switch for the daylight illumination being indicated at 86 and that for the lamp light at 87.

In addition to the main switch 84 the control board includes a switch 88 for determining the type of operation of the apparatus and conditioning it to perform either selectively at the will of the operator or automatically and continuously in predetermined sequence. In the up position of the switch 88, and assuming that the main switch 84 is in closed or up position, the apparatus is set for continuous automatic performance, while in the down position of said switch 88 the apparatus is conditioned for manual or selective control at the will of the operator, under which the selected rug is carried to display position where it comes to rest and remains until the operator elects to return it.

The control board accordingly includes a third switch 89, for use during operator-controlled or selective operation, to initiate the down or display movement and the return or storage movement respectively of a rug. Assuming that the main switch 84 is closed and that the operation-selecting switch 88 is in down position, the movement-controlling switch 89 is thrown down to start an outward or display movement of a selected rug, and is subsequently thrown up to start the return movement. For the further convenience of the operator pilot lights may be provided to indicate visually that a rug displaying operation or a rug returning operation of the apparatus is taking place, whether these operations are at the time either under selective or continuous automatic control. For this purpose we have illustrated the pilots 90 and 91, at opposite sides of the switch 89, and desirably of different color, as red and green and respectively signaling the return or up operation and the display or down operation.

Desirably provision in made for locking the switch 88, which determines the type of operation of the apparatus, in its selective or manual control position, during switch operation. Such locking means may be similar to that as disclosed in our copending application Serial No. 614,468 including, see Figs. 1 and 11, a knob 92 at the front of the switch panel and connected to a finger 92ª at the rear of the switch panel. By turning the knob 92 the finger is moved down into its dotted line position of Fig. 11, behind a projection on the switch lever and so preventing the latter from being moved to up position, without first deliberately turning the knob 92 to remove the obstructing finger 92ª. Hence, unnecessary or careless movement of the switch 88 into position for continuous operation while an operator-control cycle is still in progress is obviated.

In accordance with one form of wiring arrangement, that illustrated in Fig. 12, a certain position of the selective or manual control switch 89 is desired when the apparatus is to be put into automatic operation. At such time the selective control switch 89 should be in its up or rug returning position. To insure that such is the case, we may provide a mechanical connection between the operating members of these two switches 88 and 89, for example, as illustrated, partly diagrammatically, in Fig. 11. At the back of the panel for these switches is a pair of small bell cranks 93, one adjacent the automatic switch lever 88 and one near the selective switch lever 89. The vertical arms of these bell cranks are pivotally connected by the link 93ª. Pivoted to the other arm of the right-hand bell crank is a rod 94 extending down and ending in a foot 95 underlying the selective switch lever 89. The second arm of the other bell crank has a similar rod 96 pivoted to it. An offset portion 97 at the bottom of this rod lies above the automatic switch lever 88. To throw the apparatus to automatic operation the switch 88 is to be moved to its up position. In so doing it will be obvious that through the described vertically movable rods 94, 96 and their interconnections, the selective switch lever 89 will likewise be moved to its up position, in case it did not occupy that position when the automatic switch lever was lifted, thus compelling its proper position. But with the switch 88 down, for manual or selective operation, the switch 89 is free to be moved as desired at the will of the operator, without disturbing the switch 88.

Additional means is also desirably provided so that the operator or person viewing the rugs may temporarily and instantaneously halt a rug in any position thereof, either during selective or full automatic operation of the apparatus. Such halting is desirably so accomplished that the particular cycle or sequence of operations may be resumed at the point where halted, at the will of the operator. For this purpose we have herein provided one or more foot operable buttons 98, of which a number is illustrated in Fig. 4, distributed at various convenient points about the edge of the platform 18. One such button or master control element is illustrated in detail in Figs. 9 and 10, each comprising the button proper 98 which is vertically movable in a housing 99 set into the platform floor and normally held up by a spring 100, the construction of these switches or buttons being such as to make contact across the conductors 101 when the button is depressed. These conductors are so arranged as to short circuit the entire apparatus. Merely by stepping on or pressing any one of the illustrated buttons 98 all parts of the apparatus are brought to rest, so that the operator or observer has any rug under his immediate control, either during selective or full automatic operation. Hence, if any certain rug attracts particular attention, it may be halted at any point in its cycle of movement, for further examination.

The selector mechanism, as to the structural parts at the rear of the control panel, may be substantially as fully disclosed in our copending application Serial No. 614,468, and need not here be illustrated or described in fuller detail or other than in connection with the description of the circuits and wiring connection of the wiring diagram, Fig. 12.

Referring now to said Fig. 12, the operating or motor circuits, carrying A. C., are shown separately at the lower half of the sheet, for the sake of clearness; while the conditioning and control circuits, carrying a low voltage D. C. are illustrated at the upper section of the sheet, rather than superposing one on the other in their mechanical positions.

Considering first the A. C. or operating portion of the diagram, at the lower portion of the sheet, the A. C. power mains are indicated at the right at 110, the main switch 84 and main line pilot 85 being seen at the lower right corner. The reversible motor for the rug-extending and returning belts is represented at 40. The common side of said belt-driving motor is connected with one side of the mains 110 by the lead 111, the motor circuit being completed, in accordance with the direction of drive desired, through one blade of either the "down" or the "up" relay-operated switches 41a and 41b and the return line 112. The "up" and "down" pilot lights 90 and 91 respectively are in circuit across the mains 110 through another blade of the corresponding switches 41b and 41a and said return lead 112.

The several series of individual rug motors, disposed in the three rug sections or banks, are indicated at 50. They also are of the reversible type. Each has common connection with the lead 111 at their common sides, and each is in circuit, for operation in one or the opposite direction, through the "down" lead 113 or the "up" lead 114 connected respectively with a third blade of the "down" switch 41a and the "up" switch 41b and thence back to the mains through the return line 112.

It is desirable that the rug motors 50 for the individual rug drums shall be stopped quickly or substantially instantaneously at the end of a "down" or an "up" operation, without over-running, either when the drums are loaded with a rug, or when empty. When carrying the rug or other article of similar weight, the revolving drum naturally builds up a considerable momentum. It is also desirable to stop the drums quickly and accurately in a desired position, irrespective of whether their momentum is great or otherwise, for example, in connection with attaching a rod, adjusting the attaching straps to the proper length, etc. Accordingly provision is desirably made, herein electrically, for braking the drums and bringing them immediately to rest, in either direction of their rotation. In the illustrated form this is accomplished by so-called "plugging" of the motors, that is, supplying a current for an instant tending to operate them in the reverse direction as they are shut off, thus immediately bringing them to rest. Mercoid switches and relays for this purpose are provided in the control circuits, to be referred to in connection with the upper portion of the diagram, Fig. 12. Said mercoids and relays operate the plugging switches 115 and 115a, for "down" braking and "up" braking respectively, represented at the left central portion of the lower section of Fig. 12.

In the "up" or return circuit of the belt-operating motor 40 is a resistance element 116, which is arranged to be by-passed through the mercoid switch 117 during the first part of a rug-returning movement, while the rug in whole or part is resting upon the platform and belts, but which becomes effective to slow the motor during the latter part of the rug-return period. This mercoid switch 117 is mounted upon the outer and shorter depressible arm 72, Fig. 4, actuated by the various rug holders or clamps 71. During display of a rug, and the first part of the return, its clamp holds said arm 72 down, with the mercoid switch 117 tilted in the opposite position to that shown in Fig. 12, closing the A. C. contact at the right end of said mercoid and thus shorting the resistance 116. When the returning rug clamp disengages the arm 72, the mercoid tips to its illustrated position, Fig. 12, interrupting the shorting of the mercoid and rendering the resistance effective. The belt motor 40 therefore is slowed down, accommodating the belt speed to the capacity of the rug drum as the load of lifting and winding up the rug comes onto the latter. Otherwise, if the desired initial relatively high return speed of the belts were maintained, the rug might loop and pile up objectionably on the belts.

The left portion of the mercoid 117 is shown dotted, in this lower section of Fig. 12, as it is not concerned with the operating or A. C. circuits, but relates to the control or D. C. circuits at the upper portion of the diagram, where it is shown in full line.

In the illustrated form, the A. C. mains 110 also supply current to a motor 118 for operating a generator 119 to supply D. C. current for the control circuits, preferably of a low voltage, such as 12 volts, or the D. C. current may be otherwise supplied, as from a trickle charger.

The D. C. or control circuits illustrated at the upper portion of Fig. 12 relate mainly to the control of the main relays or switch-closers 41 for the three A. C. circuits and to the control of the relays or switch-closers 62 for the individual rug motors. These latter are represented diagrammatically at the upper left of the top section of Fig. 12, shown arranged in three groups or banks similarly as the motors 50 at the bottom portion of Fig. 12, it being understood that these relays are located each adjacent its corresponding motor, in the manner previously described and illustrated in Fig. 2. Each such relay is adapted to close the motor operating A. C. circuits at its motor, for actuating the latter in one or the opposite direction.

The several control circuits include those for the manual selective control of the apparatus, those for the automatic or continuous operation of the apparatus to display and return the rugs in automatic or predetermined sequence, and the provisions for interrupting the operation as desired and for operating under special conditions, such as in connection with installing or removing one or more rugs, or for bringing down or returning an empty rug holder or clamp, for extending a rug or an empty clamp abnormally, and for other special purposes.

Referring to said upper or D. C. section of Fig. 12, one side of the D. C. line is grounded as indicated at 120, and each of the several circuits referred to is completed by grounding, either through the particular motor relay 62 to a ground as represented at each such relay, or to the ground adjacent the selector solenoid 135 and holding coil 136 to be referred to.

The control board or panel 80 is shown diagrammatically at the upper right of the figure, the mechanism and arrangement being understood as similar to that of our copending application S. N. 614,468. But one section of selective contacts 83ª, corresponding to the buttons or indicia 83 at the front of the dial 81, is shown, together with the wiring connections to the corresponding series or bank of motor relays 62. Similar contacts are provided for each additional rug motor or series of motors, three series being illustrated, and the conduits for their wiring connections being indicated at 66. The manually or automatically movable pointer 82, as in the previous application referred to, is adapted to complete a circuit across between the particular individual contact 83ª and an annular contact 121, to which is connected a line 122.

The previously described switch 89, see Figs. 1 and 11, for initiating the "down" and "up" operations, under operator-selective manual control, is seen at the lower right corner of this upper half of the diagram, adjacent the operation-selecting switch 88. As apparent from the diagram and as previously described in connection with Fig. 11, this switch 88 is thrown to closed position on its lower contact, for manual operation, and is thrown up onto the upper contacts for automatic operation. Also, as before noted, the "up" and "down" manual control switch 89 must be closed across onto its top contact, that is, in "up" position, when the apparatus is to run automatically through a sequence of display and return cycles.

Under manual control the circuit and connections for a "down" operation are as follows: from the generator 119 through lead 123 and through the several closed "master-stop" buttons 98 (located, for example, about the edge of the platform, Fig. 4), across the central and bottom poles of switch 88 (then closed down into "manual" position) across on connection 124 to the manual control switch 89 and out through its bottom contact (said switch having been thrown by the operator to "down" position), across through the lock coil 125 (which locks the selector mechanism 82, etc. as in the preceding application), across through the full-line left half of mercoid 117 (which is now positioned as shown, the rug-clamp actuated arm 72 being as yet not depressed by the descending rug), across the closed top portion of the "jogging" switches 126, to be referred to later, over through the "down" coil of the main relays 41, onto the line 122 to and across the particular selected contact 83ª and to the corresponding motor relay 62 and thence to ground. The closing of said "down" coil of the main relays 41 closes the triple-pole switch 41ª, previously described in connection with the lower half of the diagram, thereby lighting the "down" pilot 91, starting the belt motor 40 in the "down" or "out" direction, and cutting in the selected rug motor 50.

As the rug moves down from its drum it descends onto the long central depressible conditioning arm 75, see Fig. 4. On this arm 75 is mounted a mercoid switch 127, seen at the extreme left of the upper, control section of Fig. 12, and which occupies the position as there shown prior to the depressing of the arm 75. The pair of contacts at the left portion of this mercoid 127 function only in connection with the automatic circuits later referred to. The pair of contacts at the right of said mercoid 127, under either type of operation, are closed when the mercoid tips to its opposite position from that shown in the diagram, as the down coming rug depresses the arm 75, thereby conditioning the "up" or "return" circuit for subsequent operation.

When the rug has been brought to its desired fully extended position upon the platform and the rug carrier or clamp 71 has accordingly moved forward into depressing contact with the shorter depressible arm 72, previously referred to, see Fig. 4, the mercoid switch 117, seen in both the top and bottom sections of the diagram, and which is mounted on said shorter arm 72, is tipped to the position opposite that illustrated. This opens the "down" D. C. circuit, through the contacts at the left of said mercoid 117 and hence deenergizes the "down" coil of the main relays 41. The A. C.-controlling "down" switch 41ª, which is of the spring type, therefore opens, thus completing the entire "down" movement and leaving the circuits in readiness for the return operation.

It will be noted that the tilting of the mercoid 117, to complete this "down" operation, closes the A. C. circuit at the right portion of said mercoid 117 thus conditioning the latter to short-circuit the belt motor resistance 116 during the first portion of the return movement, as previously described.

At the end of a "down" operation, whether manual or automatic, the braking or plugging of the rug drum motors 50, previously mentioned, is effected through a mercoid switch 128, Fig. 12, also operatively mounted on the shorter depressible arm 72 which carries the mercoid 117. This mercoid 128 is of the instantaneous make-and-break type, having but one set of contacts which is momentarily closed only as the mercury moves past and in contact with them during the actual tipping of the switch. When its contacts are closed, by the depressing of said shorter arm 72 at the end of the "down" movement, a circuit is thereby momentarily completed, from the generator through the line 123 previously mentioned, through said mercoid 128 along a connection 129, and through a special relay or switch-closer 130, onto the line 122. Said relay 130, marked "up" on the diagram, operates the plugging switch 115ª, at the lower section of the diagram, also marked "up". The rug motor is thus energized in the "up" direction, for an instant only, counteracting any tendency to overrun in the "down" direction and bringing it instantly to rest.

The ensuing "up" operation, under manual control, is complementary to that just described in connection with the "down" operation. The operation-selecting switch 88 remains closed across the lower contacts, for manual operation. When the operator wishes to return the rug, he moves the selective control switch 89 so as to complete the circuit from the line 123 and connection 124 across the upper contacts of the switch. The circuit is then across through the upper portion of the lock coil 125, along a connection 131, through the previously conditioned, closed right-hand contacts of the mercoid 127, along a connection 132, onto and across the jogging switch 126, and back across the closed lower section of said switch onto a further connection 133, energizing the "up" coil of the main relays 41. Said "up" coil 41 is connected to the line 122, thereby completing the circuit through the selector mechanism and to the selected motor relay 62 and to ground, similarly as described in connection with the "down" circuit.

This energizing of the "up" coil of the main relays 41 closes the triple pole "up" switch 41ᵇ for the three A. C. circuits, thereby lighting the "up" pilot 99, starting the belt motor 40 in the return direction but initially at its relatively higher speed, the resistance 116 being at first shorted through the right hand contacts of the mercoid 117, and also starting the particular drum motor 50 whose relay 62 is then in circuit.

When the rug carrier or clamp 71 has moved back off the shorter depressible arm 72, permitting the latter to rise, the mercoid 117 on said arm 72 tips back into its original position as it appears on Fig. 12. This breaks the A. C. resistance-shorting by-pass at the right of said mercoid, thereby throwing the belt motor circuit through the resistance 116 and slowing down said belt motor. Said tilting of the mercoid switch 117 also closes the D. C. "down" circuit at its left-hand contacts, reconditioning the "down" circuit for its next operation. The accompanying retilting of the plugging mercoid 128 has no effect at this time, as the rug motor 50 is already running in the "up" direction.

Thus the rug is carried back, by the return movement of the conveyor belts 21 and by the reverse driving of the particular drum motor concerned, to rewind the drum, the conveyor or belt motor 40 first operating, during this return, at a relatively high speed, to take the rug back quickly while there is still little load upon the rug drum, and then more slowly as the rug drum completes the heavier portion of the rewinding operation.

These actions continue until the rug lifts up off the longer central depressible arm 75, permitting the latter to rise. The mercoid 127 carried on said arm 75 is thereby retilted to its position as shown on Fig. 12, so opening its right hand contacts and breaking the D. C. circuit containing the "up" coil of the main relays 41. This accordingly allows the spring-returned triple-pole A. C. switch 41ᵇ at the lower section of Fig. 12 again to open. All elements come to rest, completing one full "down" and "up" or display and return cycle but leaving the parts conditioned for the next operating cycle. Thus it is seen that the rug beams and their drive means, herein the individual motors 50, as well as the conveyor means, are predeterminedly halted when a rug has been extended, or returned, to the appropriate extent.

The braking or plugging action for the rug drum motor 50, at the "up" end of the cycle, similar to that as described for the "down" operation, is effected through a separate mercoid 134, mounted on the same depressible arm 75 with the mercoid 127. Said mercoid 134 is of the same type as the plugging mercoid 128 previously described. It is arranged instantaneously to make and break a circuit through the line 123 from the generator and through a line 135 and a plugging relay or switch-closer 136, marked "down" on the diagram, into the line 122. Said plugging relay 136 acts to close the A. C. plugging switch 115, seen in the lower section of Fig. 12, marked "down," thus neutralizing any overrunning of the drum motor in the "up" direction.

The circuits for the full automatic operation of the apparatus will readily be understood from the diagram, Fig. 12, in connection with the preceding description of the manual control circuits. For such automatic or continuous sequential operation, the operation-selecting switch 88 is thrown into position to make contact at its upper points. The manual control switch 89 is placed into position as for "up" operation, such positioning of the switch being automatically provided for either through a mechanical interconnection of said switches as described and illustrated in Fig. 11 or by so interwiring the two switches that said condition automatically results.

The operation of the A. C. or operating circuits, at the lower section of Fig. 12, remains the same. The control or D. C. circuits, at the upper section of Fig. 12, also function in a generally similar manner, but additionally a solenoid 135 and its holding coil for automatically stepping around the dial hand 82 and the associated selector mechanism, to select the next rug for display, come into operation, and also the initiating both of the return movement and of the next "down" movement, previously done manually at switch 89, is then accomplished automatically.

Under this automatic operation, the contacts at the left of the mercoid 127, on the longer central depressible arm 75, become operative. These contacts are connected respectively to a connection 137 from one upper point of the operation-selecting switch 88, and to a connection 138 with the main operating coil of said solenoid 135 whose other side is grounded. They remain closed, as shown in Fig. 12, during the initiating of a "down" operation and accordingly energize said selector solenoid 135 which steps the rug selecting mechanism around to the next desired contact 83ª. This solenoid-energizing circuit is broken, at said left-hand contacts of the mercoid 127, when the descending rug comes down onto and depresses the central arm 75, thereby tipping the mercoid to a position opposite that of Fig. 12, and incidentally also closing the contacts at the right end of that mercoid 127 and so conditioning it for the subsequent "up" movement.

This operation of the selector solenoid 135 also effects the tipping of an additional mercoid switch 139, mounted for such actuation. Said mercoid 139, as moved by the solenoid, assumes the position opposite to that as illustrated, closing its left-hand contacts. This establishes a circuit through a connection 140 onto the switch 88 and a connection 141 to the lower coil of the lock coil 125 and thence the same as described for manual-selective operation. There is also a circuit through a connection 142 across from line 122 to the holding-down coil 136 of the selector mechanism and to ground (which circuit is also set up under manual-selective operation but is then immaterial because the solenoid itself is not operated). Therefore the solenoid is held down, despite the previous breaking of its own circuit, at the left contacts of mercoid 127, when the rug depressed the arm 75.

Accordingly the automatically selected rug is moved out into display position, just as under manual-selective operation, until this movement is halted by the rug carrier or clamp 71 depressing the short arm 72. Such depression of said arm 72 tips the mercoid 117 so as to break the circuit at its left end (just as under manual-selective operation), but as said circuit at this time included the hold-down coil 136 the latter is de-energized and so releases the core of solenoid 135 and permits the mercoid 139 to tip back to its position as shown in the diagram. The rug comes to rest in display position, by reason of said circuit breaking (which let off the down A. C. switch 41ª as under manual-selective control), but it remains at rest only momentarily, in this instance.

The rug automatically starts its return because the tipping of the mercoid 139 just mentioned closes the right hand contacts of the latter, now in their position as in the diagram. Said contacts, through their connections, one to the connector 140 and so to the switch 88 and the other by a connection 143 with the switch 89 (which is in "up" position during this automatic operation) establish the return circuit automatically, the parts controlled thereby functioning similarly as under the manual-selective operation.

When the rug lifts off of the center arm 75 the mercoid 127 tips back to its position as in the diagram Fig. 12, halting the "up" movement by breaking the circuit at the right-hand contacts of said mercoid 127, but under this automatic type of operation also at the same time closing the now effective contacts at the left of this mercoid 127, again to operate the solenoid 135 to shift the selector mechanism and automatically institute the next "down" and "up" cycle. Hence the automatic operation continues through uninterruptedly successive cycles of down and return movements, so long as the apparatus remains in operation, one rug after another being selected, displayed, and returned to storage.

In other words, the additional mechanical and electric devices described in connection with the automatic functioning of the apparatus serve to step around the selector mechanism automatically and also to accomplish automatically what is done by the operator's manipulation of the switch 89 under manual control, that is, to initiate the return movement, after a "down" operation, and also automatically to close the circuits for another "down" movement, at the completion of each full cycle.

It will be noted that any one of the "master-stop" switches or buttons 98, which are conveniently located at any desired point, as about the edge of the display platform, see Fig. 4, serves to break the main control circuit, being set in the line 123. Any of them accordingly may be used, at any time, during either manual or full automatic operation, to halt the rug in its then position, at the will of the operator. Release of such stop button restores the apparatus to its same operative condition as when interrupted. If for any reason it is desired to render these master-stop elements 98 inoperative, for example, to provide against unauthorized tampering with the apparatus during its operation, this may be effected through the medium of a cut-out switch 98ª, Fig. 12. This may be located at any convenient point, for example, at the side of the apparatus, as seen in Fig. 2.

It has been found desirable to provide additional special control for the apparatus in connection with installing or demounting one or more rugs, for bringing down or returning empty rug holders or clamps, to facilitate application of a rug thereto, or for running out either a loaded or an empty holder or clamp a greater or less distance than is provided for under normal operation of the apparatus as previously described, and for returning the same. For example, it is sometimes helpful to turn a rug drum one or more partial or complete turns in one direction or the other, to bring it into some particular angular position, to adjust the length of strap between the drum and the rug clamp, or to let out the clamp to an extreme position, or for the purposes of other adjustments or manipulations. It is also desirable to manipulate the conveyor belts at such times.

To this end we have herein provided the double element switch 126 seen in Fig. 12 and previously referred to as the "jogging" switch. Said switch may be located at any desired or convenient point, for example, as shown in Fig. 2, at some position behind the decorative front of the apparatus and adjacent the rug storage units or drums themselves, where it will be readily accessible to one who is installing, unclamping or adjusting a rug. Both elements or sections of this jogging switch 126 as illustrated are of the spring-actuated double-throw type and normally stand in position closing the "up" and "down" circuits across them in the manner as seen in the diagram.

This jogging switch, or pair of switches, 126, provides a means for completing a circuit through either the "up" or the "down" coil of the main relays 41, irrespective of the condition of other parts of the circuit-controlling apparatus, this being accomplished through a connection 126ª direct from the generator line 123 and connections to the bottom pairs of contacts of said switch element 126 as shown in the diagram. When it is desired to jog the apparatus, both as concerns the conveyor belts and the drums, in the "up" direction, the button shown at the upper portion of said jogging switch 126, marked "up,"

is depressed, thereby opening the usual "up" circuit but completing a shorter one, controlling the main clasp 41, through the pair of contacts appearing immediately below said button. The button at the lower section of the jogging switch 126, marked "down," serves a similar purpose in connection with a jogging operation in the "down" direction.

For similar purposes, and particularly for running out or returning an empty rug holder 71, additional switches may be provided, for example, at a point convenient to the usual control station or board 80, as indicated at 144, 145, Fig. 2, at the side of the decorative front of the apparatus. The switch 145, as seen in Fig. 12, provides for effecting a short circuit in the "up" control side, by cutting out the contacts at the right of the mercoid 127, thus allowing the "up" movement to be continued beyond the normal, while the switch 144 serves a similar function in connection with the "down" control side, serving to shunt across the D. C. contacts at the left portion of the mercoid 117, and so providing for continuance of the "down" action, beyond the usual extent. Said switches 144 and 145 in effect take the place of the long arm 75, there being no rug present to operate the latter.

Similar safety features are desirably included as in our said copending application S. N. 614,468 including the provision for preventing, under manual operation, attempted shifting of the selector mechanism, once a display cycle is started, until the switch 89 has been moved to "up" position, said selector mechanism being constructed similarly, for example, as fully shown in Figs. 17 to 21 of said application and described in connection therewith.

Our invention is not limited to the particular illustrative embodiment herein shown and described, its scope being set forth in the appended claims.

We claim:

1. In an apparatus for storing and displaying rugs and the like, in combination with a frame, a rug beam rotatably mounted on the frame, and a power unit demountably supported on the frame in driving relation with said beam and comprising an electric motor, transmission gearing and coupling means between the motor and said beam, and a housing for said parts.

2. Storage and display apparatus for rugs and the like adapted to display the rugs individually in extended position over a display surface, comprising, in combination, conveyor belts operative along the display surface to move a rug to and from extended display position upon it, a motor to drive said conveyor belts, one or more rotary rug-supporting elements, and an electric motor adjacent and operatively connected with the rug-supporting element or elements, one for each of the latter, and each effective to let down its corresponding rug for reception by said conveyor belts and to return it from them.

3. Storage and display apparatus for rugs and the like adapted to display the rugs individually in extended position over a display surface, comprising, in combination, conveyor belts operative along the display surface to move a rug to and from extended display position upon it, a motor to drive said conveyor belts, a plurality of rotary beams each adapted to store or to let off a rug, and, for each beam, an electric motor, to drive the latter in one or the opposite direction.

4. In an apparatus for storing and displaying rugs and the like, in combination with a frame, a rug beam rotatably mounted on the frame, and a power unit demountably supported on the frame in driving relation with said beam and comprising an electric motor, transmission gearing and coupling means between the motor and said beam, a housing for said parts, and plug-in electric connections for the motor.

5. In an apparatus for storing and displaying rugs and the like, in combination with a frame, a rug beam rotatably mounted on the frame, and a power unit demountably supported on the frame in driving relation with said beam and comprising an electric motor, transmission gearing and coupling means between the motor and said beam, a housing for said parts, circuit-closing means on the housing, and plug-in electric connections for the motor and for its circuit-closing means.

6. In a rug storage and display apparatus, a floor-like platform upon which the rugs are adapted to be displayed, a plurality of endless conveyors for extending the rugs onto and returning them from the platform, the upper runs of the conveyors extending along and upon the platform, conveyor pulleys at the front portion of the platform below the display surface thereof and adjustably carried by the platform to regulate the tension of the conveyors.

7. In a rug storage and display apparatus, a floor-like platform upon which the rugs are adapted to be displayed, a plurality of endless conveyors for extending the rugs onto and returning them from the platform, the upper runs of the conveyors extending along and upon the platform, underlying longitudinal channels receiving the lower runs of the conveyors, and passages in the platform for the travel of the conveyors from the display surface to their respective channel.

8. In a rug storage and display apparatus adapted to display the rugs individually in extended position over a display-surface, a plurality of endless conveyors for extending the rugs into and returning them from extended position over the display surface, a frame at the rear of the display position, and rug storage devices on the frame above the display level, said conveyors extending rearwardly below said storage devices, and the rear portions of the upper runs of said conveyors being inclined to elevate the returning rugs from the display level in their passage to the storage devices.

9. In a rug storage and display apparatus adapted to display the rugs individually in extended position over a display surface, a plurality of endless conveyors for extending the rugs into and returning them from extended position over the display surface, a frame at the rear of the display position, rug storage devices on the frame above the display level, said conveyors extending rearwardly below said storage devices, and means adjacent the rear portions of the conveyors for urging looped or folded rug portions forwardly.

10. Storage and display apparatus for rugs and the like comprising, in combination, a frame, rug supports on the frame, and a display platform at the front of the frame and onto which the rugs are adapted to be extended and withdrawn, said platform including a plurality of separable units adapted to be assembled and releasably secured in juxtaposition.

11. Storage and display apparatus for rugs and the like comprising, in combination, a frame, rug supports on the frame, and a sectionalized element composed of a plurality of interfitted floor units together providing a knock-down platform for the reception and display of the rugs.

12. In a storage and display apparatus for rugs and the like adapted to exhibit the rugs in extended position over a display surface, a plurality of rotary beams for the individual storage, letting-off and winding on of rugs, said beams being vertically spaced from the display surface and being also horizontally offset whereby the rugs have different vertical paths in travel from the display surface to the beams, and inclined guide means fixed at the lower end of said vertical paths, defining the latter and assisting the rugs in "turning the corner" between substantially horizontal movement at the display level and substantially vertical movement to and from their beams.

13. In a storage and display apparatus for rugs and the like adapted to exhibit the rugs in extended position over a display surface, in combination, a plurality of rug beams, conveyor means to receive the rugs as let off from the beams and to extend them over the display surface, drive mechanism for the beams and for the conveyor means, a carrier for attaching a rug to its beam, and a movable control element disposed adjacent the display position and adapted to be actuated by the carrier of a rug being moved to display thereby to halt the rug in display position.

14. In a storage and display apparatus for rugs and the like adapted to exhibit the rugs in extended position over a display surface, in combination, a plurality of rug beams, conveyor means to receive the rugs as let off from the beams and to extend them over the display surface, drive mechanism for the beams and for the conveyor means, a carrier for attaching a rug to its beam, a depressible arm in the path of the carrier of a rug traveling toward display position, and a circuit-controlling element operable by said arm, to terminate the display movement of the rug.

15. In a storage and display apparatus for rugs and the like adapted to exhibit the rugs in extended position over a display surface, in combination, a plurality of rug beams, conveyor means to receive the rugs as let off from the beams and to extend them over the display surface, drive mechanism for the beams and for the conveyor means, a carrier for attaching a rug to its beam, a depressible arm in the path of the carrier of a rug traveling toward display position, and a circuit-controlling element operable by said arm, to terminate the display movement of the rug, said arm serving, upon return of the rug, to recondition the circuit-controlling element for subsequent operation.

16. In a storage and display apparatus for rugs and the like, in combination, a frame, a plurality of rugs supported thereon for edgewise extension to display position and return, means for moving a rug to and from said display position, including an electric motor, a circuit-controlling element for the motor, and laterally projecting means adjacent the rear edge of a rug and moving with it, for cooperation with said circuit-controlling element to shut off said motor when the rug reaches its display position.

17. In a storage and display apparatus for rugs and the like, in combination, a frame, a plurality of rugs supported thereon for edgewise extension to display position and return, means for moving a rug to and from said display position, including an electric motor, a circuit-controlling element for the motor, laterally projecting means adjacent the rear edge of a rug and moving with it, for cooperation with said circuit-controlling element to shut off said motor when the rug reaches its display position, and rug-operated means for halting the subsequent return travel of the rug.

18. In a storage and display apparatus for rugs and the like, in combination, a frame, a plurality of rotary beams for storing rugs and letting them off, an individual motor for driving each beam, conveyor mechanism to receive a let-off rug and extend it for display, starting and stopping means for the conveyor mechanism, means effective to operate the conveyor stopping means and to stop the rug motor as a rug reaches display position, and means whereby a subsequently returning rug effects operation of said conveyor stopping means and also stops the rug motor on arrival of the rug in its initial stored position.

19. In a storage and display apparatus for rugs and the like, a frame providing a rug storage compartment within it, a plurality of rug beams serially arranged in the compartment, supports at the beam ends whereon they are rotatably mounted, and, for each beam, a drive-unit attaching plate received by the support at one end of the beam, a sleeve bearing carried by said plate coaxially with the beam, a drive shaft rotatable in said bearing, connecting means between the shaft and the adjacent end of the rug beam drivingly connecting them but permitting their ready disengagement for demounting, a motor and a gear housing also carried by said attaching plate, and worm drive connections within said housing between the motor and said shaft.

20. In a storage and display apparatus for rugs and the like, in combination with supports at the ends of a beam, a beam drive unit demountably associated with one of the supports and comprising an attaching plate, a motor and a housing thereon, a shaft journaled in the housing and adapted for driving engagement with the adjacent beam end, and gearing connections in the housing drivingly connecting said shaft and the motor.

21. In a storage and display apparatus for rugs and the like, rotary storage and let-off means for the rugs, conveyor means to extend and to carry back a let-off rug, separate electric motors for said means, and electric control mechanism for both said means, including a system of switch devices whereby operation of said means may be manually initiated both as to the letting-off and extending movement of a rug and as to its subsequent return movement and optionally may be automatically controlled for continuous operation through a series of rugs.

22. In a storage and display apparatus for rugs and the like, electrically operated rug extending and returning means, a switch having "down" and "up" positions respectively for manually initiating an automatically terminated extending movement of said means, and for starting its subsequent automatically terminated return movement, a shift switch to condition said means either for said manual control or for automatic operation continuously through a series of rugs, and safety means compelling said manual control switch to be in "up" position when said shift switch is in automatic conditioning position.

23. In a storage and display apparatus for rugs and the like, rotary supports for storing or letting off rugs, conveyor mechanism to receive a let-off rug, extend it for display, and return it, electric motor means to drive said conveyor mechanism in one and the opposite direction, and speed controlling means operable during the return movement of the conveyor mechanism to vary the speed thereof.

24. In a storage and display apparatus for rugs and the like, rotary supports for storing or letting off rugs, conveyor mechanism to receive a let-off rug, extend it for display, and return it, electric motor means to drive said conveyor mechanism in one and the opposite direction, and automatic means whereby said conveyor mechanism is operated at one speed during the first part of its return movement and at a reduced speed during the remainder of said movement.

25. In a storage and display apparatus for rugs and the like, a frame, a rotary support thereon for a rug, an electric motor to turn said support in one or the opposite direction to let off or to wind on a rug, control means for the motor to start and stop the same during normal operation of the apparatus, and means to jog the motor, in either direction, accurately to locate the rotary rug support in a desired angular position, for adjusting, loading, and like purposes.

26. In a storage and display apparatus for rugs and the like, a frame, rug supports thereon, a rug carrier for attaching a rug to its support, means to receive a rug from a support, to extend it flatwise for display and to return it, a device controlled by the rug for halting the return movement, and means for effecting and controlling the letting off, extending and return of a rug carrier in the absence of a rug, as for rug attaching or removing purposes.

27. In a storage and display apparatus for rugs and the like, a frame, rug supports thereon, a rug carrier for attaching a rug to its support, means to receive a rug from a support, to extend it flatwise for display and to return it, control means to halt the rug in normal display position and to initiate its return movement, and means for effecting an abnormal extension of a rug or a rug carrier at the will of the operator.

28. In an apparatus for displaying rugs and the like over a display surface, a storage enclosure, a plurality of rug supports in said enclosure, mechanism for selecting and moving individual rugs to and from display position, electric operating means therefor, control mechanism to determine the operative status of said operating means, and one or more master control elements disposed conveniently to the display surface for interrupting operation of the apparatus at the will of the operator.

29. In an apparatus for displaying rugs and the like, over a display surface, a storage enclosure, a plurality of rug supports in said enclosure, mechanism for selecting and moving individual rugs to and from display position, electric operating means therefor, control mechanism to determine the operative status of said operating means, one or more master control elements for interrupting operation of the apparatus at the will of the operator, and means to render inoperative said master control element or elements.

30. Apparatus for storing and individually exhibiting rugs or the like over a display surface, comprising, in combination, individual storage mechanism for a plurality of rugs, spaced vertically from the rug display position, means to cause a selected rug to be extended toward and away from the display level, conveyor means operative at the display level to receive, extend and return a rug so extended, and separate drive means for said extending means and said conveyor means.

31. Apparatus for selectively exhibiting rugs and the like comprising, in combination, rug storage means including a plurality of rotary beams each adapted to support a rug, an individual electric motor drivingly associated with each of said beams to let off or wind on the respective rugs, means for receiving any rug as let off and moving it to extended position for exhibition, and means predeterminedly to stop the motor of the given rug thereby to halt the letting off movement of the latter.

32. Apparatus for selectively exhibiting rugs and the like comprising, in combination, rug storage means including a plurality of rotary beams each adapted to support a rug, an individual electric motor drivingly associated with each of said beams to let off or wind on the respective rugs, means for receiving any rug as let off and moving it to extended position for exhibition, and means predeterminedly to stop the motor of the given rug thereby to halt the winding on movement of the latter.

33. Apparatus for selectively exhibiting rugs and the like comprising, in combination, rug storage means including a plurality of rotary beams each adapted to support a rug, an individual electric motor drivingly associated with each of said beams to let off or wind on the respective rugs, means for receiving any rug as let off and moving it to extended position for exhibition, and means predeterminedly to stop the motor of the given rug, when driving in one or the opposite direction, thereby to halt the letting off and the winding on movements of the latter.

EDGAR F. HATHAWAY.
WALTER BIXBY.